Feb. 25, 1969  J. H. GRAVES  3,429,107

FILTER BAG WITH ATTACHED ENCIRCLING RING

Filed July 18, 1966

INVENTOR
J.H. GRAVES

BY *Young & Quigg*

ATTORNEYS

United States Patent Office 3,429,107
Patented Feb. 25, 1969

3,429,107
FILTER BAG WITH ATTACHED ENCIRCLING RING
John H. Graves, Borger, Tex., assignor to Phillips Petroleum Company, a corporation of Delaware
Filed July 18, 1966, Ser. No. 565,824
U.S. Cl. 55—378                                   3 Claims
Int. Cl. B01d 29/14

ABSTRACT OF THE DISCLOSURE

The life of fiber glass filter bags using encircling rings for holding the bags open during backflowing to remove filtered solids is substantially increased by encasing each ring in a fiber glass casing, preferably double-walled, and stitching the casing to the wall of the bag.

---

Figure 1:
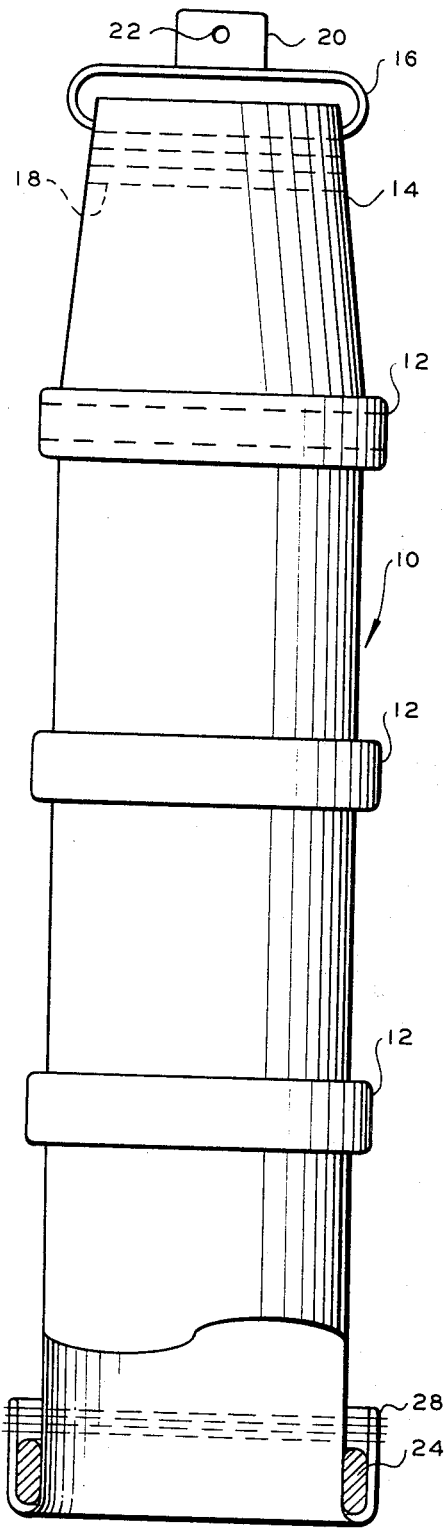

This invention relates to a filter bag having at least one encircling ring attached to the bag and to a method and structure for attaching such a ring to a filter bag.

In many industries there exists the problem of removing suspending solids from a stream of gas which is to be vented to the atmosphere. In some instances it is desirable, from an economical standpoint, to recover the solids. In other instances it is desirable, particularly in congested populated areas, to remove the solids from the vented gases to avoid pollution of the atmosphere. Various designs of different types of filtering equipment have been developed and are in use at the present time. One type of filtering apparatus used is that commonly called the "bag filter." The instant invention relates to such a bag filter and will be described and illustrated as applied to the separation of carbon black particles from the hot effluent gas suspension coming from a carbon black furnace. However, it is to be understood that the instant invention is not to be unduly limited to such application since it can be employed in any system where it is desirous to remove heavier-than-air solids from a gas, using alternate flow of feed gas into the bag thru its mouth and backpressuring thru the wall of the bag and out of its mouth.

The filter bags with which the invention is concerned are disclosed and illustrated in the patent to H. A. Larson, U.S. 3,243,940, issued Apr. 5, 1966. The bags of said patent with rings encircling same have added substantially to the recovery of carbon black in pounds per hour per bag; however, in plant operation using the rings attached to the bag in the various means shown, fiber glass bag life was limited to about 60 to 75 days, the rings causing deterioration of the bags around the ring area in this period of use.

This invention is concerned specifically with an improved method of attaching the rings encircling a filter bag and with a resulting structure which greatly enhances the utility of the bag by increasing its life.

Accordingly, it is an object of the invention to provide an improved filter bag having attached encircling rings and a method of attaching encircling rings to a filter bag. Another object is to provide a ring attachment means for a filter bag which greatly increases the life of the bag as compared with ring attachment means of the prior art. Other objects of the invention will become apparent to one skilled in the art upon consideration of the accompanying disclosure.

A broad aspect of the invention comprises an elongated tubular filter bag formed of gas-permeable fabric having at least one rigid ring substantially the diameter of the bag encircling same intermediate its ends including a casing of fabric completely enclosing or encasing the ring to provide at least one layer of fabric between the ring and the wall of the bag, said casing extending outwardly from each edge of the ring a substantial distance providing sections or widths of fabric for stitching the casing to the bag wall, said sections or widths being stitched to the bag wall. When utilizing a plurality of rings, the rings are substantially uniformly spaced intermediate the ends of the bag. The preferred material for the bag and the casing for the ring is woven fiber glass but other materials may be utilized, including "Orlon" polyacrylonitrile synthetic fiber. The bag may also be woven of other types of fibers which withstand the temperatures to which the bags are subjected in the filtering operation. In application to carbon black filtering, temperatures reach approximately 450° F. and fiber glass is best suited to this type of service.

In applying the ring to the bag, the ring is first completely encased in the selected fabric (woven fiber glass) which is usually the same fabric as the bag itself. A loop of the fabric, preferably a double loop, is placed around the ring and the open edges of the loop are stitched together and the encased ring is placed on the bag at the desired location for stitching to the bag wall. The casing around the ring is considerably larger than the ring to provide excess material along each edge of the ring for stitching the casing to the bag wall and the loop or casing of material is then stitched directly to the bag wall. It is also feasible to form the casing of two or more substantially identical pieces of fabric with raw edges in each side of the ring. This is not as convenient in encasing the ring in that it requires an extra row of stitching prior to attaching the encased ring to the bag. Also, fiber glass has a tendency to fray along cut edges and the casing is much more durable when the raw edges are blind.

Figure 2:
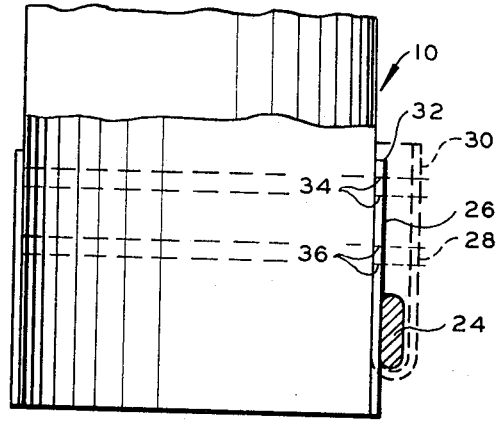
Figure 3:
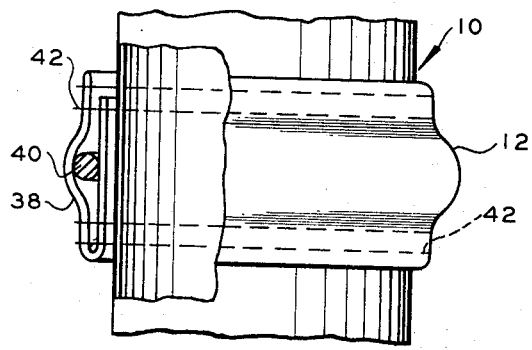

A more complete understanding of the invention may be had by reference to the accompanying schematic drawing of which FIGURE 1 is an elevational view of a bag made in accordance with the preferred embodiment of the invention; FIGURE 2 is a fragmentary view in partial section illustrating a preferred method of forming the bottom end structure of the bag of FIGURE 1; FIGURE 3 is an elevational view in cut-away partial section of a ring attachment shown in FIGURE 1; and FIGURE 4 is a view similar to FIGURE 3 showing another embodiment of the invention.

Figure 4:
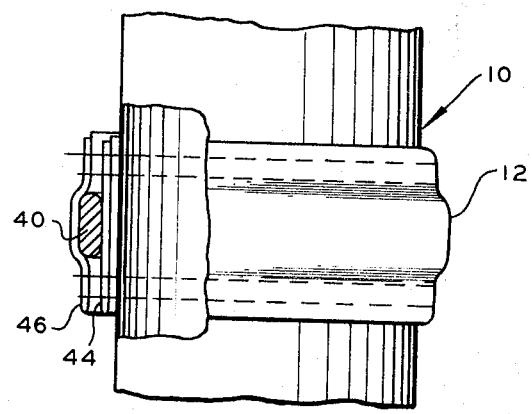

Referring to FIGURE 1, a filter bag 10 in continuous tubular form fabricated of woven fiber glass or other suitable fabric is provided with identical ring structures 12 shown more fully in FIGURES 3 and 4. The upper section of the bag 14 is tapered and the folded upper end thereof is passed thru hanger ring 16, backfolded over bag section 14, including asbestos cloth between the ring and the fiber glass loop, and stitched thereto with a quadruple row of stitching 18. Attached to hanger ring 16 is a plate 20 containing a bolt hole 22 for attaching to the roof of the bag filter unit.

The lower end of the bag is formed so as to provide double layers of fabric between the bag and ring 24 and outside of the ring. The method of enclosing the ring as shown in FIGURE 2 comprises backfolding the lower end of the bag on the outside wall to provide a substantial overlap 26 as shown in FIGURE 2, thereafter placing ring 24 as shown, and again backfolding the resulting bottom double end of the bag over ring 24 as shown in dotted lines 28. The amount of fold is regulated so that the double fold at 30 extends higher on the bag than the raw edge 32 so that upon stitching at 34 and 36 the raw edge is blind.

The structure associated with ring 24 permits a gas-tight connection with the upwardly extending chimney ring in the floor of a bag filter unit. The lower end of the bag, and particularly ring 24, is slipped over the outside of the upwardly projecting chimney ring and a clamping ring is then placed around the lower end of the bag to clamp the bag to the chimney.

Referring to FIGURE 3, a double loop 38 of fiber glass fabric is formed around ring 40 and stitched as at 42. This stitched double loop encircling the ring 40 is then placed in encircling position at the selected level of the bag and stitched thereto above and below ring 40, as shown, so that the raw edges of double loop 38 are blind. Thus, two rows of stitching above and two rows below ring 40 attach the casing 38 to the filter bag.

It is also feasible to encase and attach the encased ring structure to the bag as illustrated in FIGURE 4 wherein two separate loops of fiber glass 44 and 46 are formed with the ring 40 between the loops and the loops are stitched to each other and to the bag with two rows of stitching above and below the ring. This construction leaves 4 raw edges of fabric, which is less desirable than the blind edge construction shown in FIGURE 3.

As shown, ring 40 may be of any selected cross section, such as circular as shown in FIGURE 3 or a ring of oval cross section or a flat ring with rounded edges as shown in FIGURE 4.

About 4800 filter bags with stitched rings as shown in the drawing and described herein, utilizing the embodiments of FIGURES 2 and 3 for the attachments, have been installed in a carbon black plant. The first 396 installed have been in service 10 months and no failures have occurred. The bags were 10 ft. 6 in. long and 3 rings were placed at intervals of 2 ft. 7½ in. and like spacing from the ends, the bags being 5¼ in I.D. fiber glass. The earlier bags were the same except for the ring casing structure. This demonstrates a great improvement in the life of the bags over the life of identical bags formed of woven fiber glass but having the rings installed inside the bag and connected with a stiff threaded rod between each ring which required replacing in this plant after 60–75 days.

Certain modifications of the invention will become apparent to those skilled in the art and the illustrative details disclosed are not to be construed as imposing unnecessary limitations on the invention.

I claim:

1. A filter bag in elongated tubular form open at one end and closed at the other, adapted for suspending by the closed end, said bag being formed of gas-permeable fiber glass fabric having rigid metal rings substantially the diameter of said bag encircling same intermediate its ends, said rings being substantially uniformly spaced along said bag, each said ring being attached to said bag by completely encasing same in a continuous fiber glass fabric casing formed of annular layers covering the ring on the inner and outer surfaces thereof and said casing being stitched to said bag above and below the ring to provide two layers of fabric between said ring and the wall of said bag, said casing substantially reducing wear on the bag wall and increasing the life of the bag.

2. The bag of claim 1 wherein said casing is a double loop of fiber glass fabric, said loop being substantially wider than the width of said ring to provide a width of fabric for stitching adjacent each edge of said ring, and said width of fabric is stitched to the wall of said bag to fix said ring and casing thereto with the raw edges of said loop overlapped by the folded edge thereof, thereby binding said raw edges.

3. The bag of claim 1 wherein said closed end is provided with hanging means and the other end terminates in an encircling ring enclosed in a double fold of the end of the bag formig a double-walled casing therefor with the raw edge of said bag end concealed under the folded edge thereof.

References Cited

UNITED STATES PATENTS

| | | |
|---|---|---|
| 2,143,664 | 1/1939 | Snyder. |
| 2,308,309 | 1/1943 | Ruemelin et al. _____ 55—377 |
| 2,308,310 | 1/1943 | Ruemelin et al. _____ 55—323 |
| 2,805,731 | 9/1957 | Kron _____ 55—341 |
| 3,230,992 | 1/1966 | Kish _____ 150—1.5 |
| 3,243,940 | 4/1966 | Larson _____ 55—341 |

HARRY B. THORNTON, *Primary Examiner.*

BERNARD NOZICK, *Assistant Examiner.*

U.S. Cl. X.R.

55—381